(12) United States Patent
Okamura

(10) Patent No.: US 8,369,697 B2
(45) Date of Patent: Feb. 5, 2013

(54) OPTICAL DEVICE

(75) Inventor: Satoshi Okamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 74 days.

(21) Appl. No.: 13/153,851

(22) Filed: Jun. 6, 2011

(65) Prior Publication Data

US 2011/0310484 A1 Dec. 22, 2011

(30) Foreign Application Priority Data

Jun. 22, 2010 (JP) ................................ 2010-141884

(51) Int. Cl.
*G03B 17/00* (2006.01)
(52) U.S. Cl. .......................................... 396/55
(58) Field of Classification Search .............. 396/52–55; 348/208.3
See application file for complete search history.

(56) References Cited

U.S. PATENT DOCUMENTS

| | | | | |
|---|---|---|---|---|
| 5,294,991 A | * | 3/1994 | Oshima et al. | 348/208.5 |
| 5,745,799 A | * | 4/1998 | Morofuji | 396/55 |
| 6,208,377 B1 | * | 3/2001 | Morofuji et al. | 348/208.8 |
| 2006/0083502 A1 | * | 4/2006 | Higo | 396/55 |
| 2010/0074605 A1 | * | 3/2010 | Washisu | 396/53 |
| 2011/0013896 A1 | * | 1/2011 | Kawahara | 396/55 |
| 2011/0164864 A1 | * | 7/2011 | Taguchi | 396/55 |

FOREIGN PATENT DOCUMENTS

| | | |
|---|---|---|
| JP | 04-328533 | 11/1992 |
| JP | 09-080556 | 3/1997 |

* cited by examiner

*Primary Examiner* — W. B. Perkey
(74) *Attorney, Agent, or Firm* — Cowan, Liebowitz & Latman, P.C.

(57) ABSTRACT

An optical device includes a shake detection unit configured to detect shake of the optical device; a correction unit configured to correct image blur in a sensed image; a position detection unit configured to detect position of the correction unit; a correction control unit configured to control driving of a shake correction unit based on the output of the shake detection unit and on the position of the correction unit; a panning detection unit configured to detect whether the optical device is panning and detect a direction of the panning; an eccentricity direction detection unit configured to detect an eccentricity direction based on the output of the position detection unit; and a changing unit configured to change correction characteristics of the correction control unit, wherein the changing unit changes the correction characteristics of the correction control unit based on the eccentricity direction and the panning direction.

8 Claims, 5 Drawing Sheets

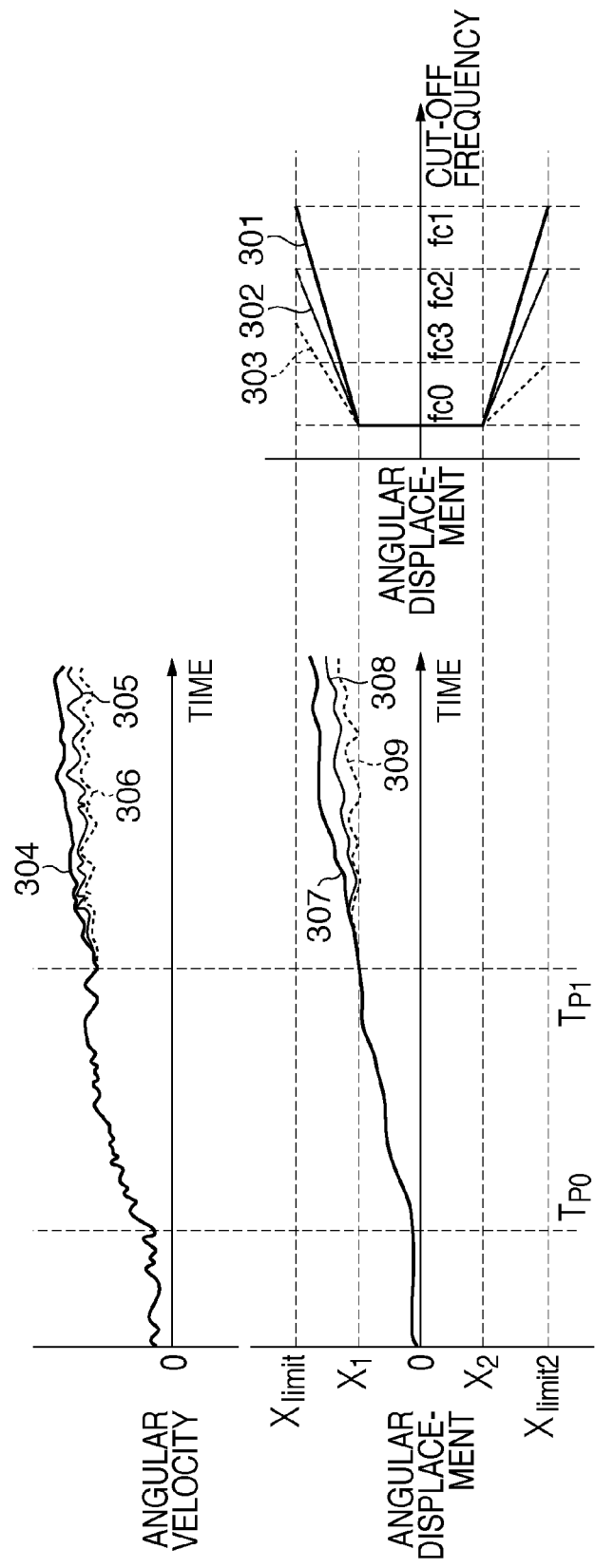

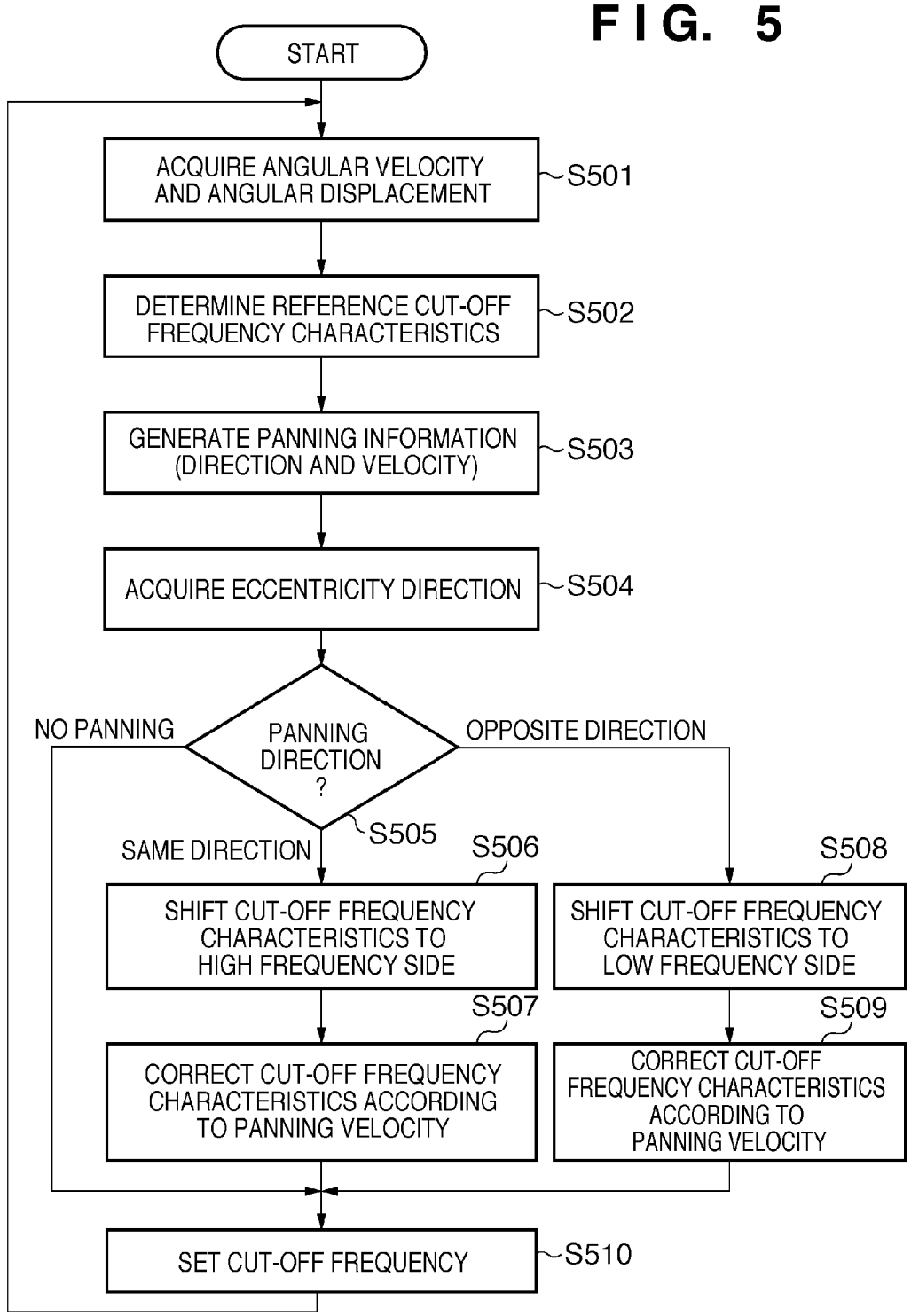

OPTICAL DEVICE

BACKGROUND OF THE INVENTION

1. Field of the Invention

The present invention relates to an optical device having the capability to optically correct image blur in a sensed image due to camera shake and the like.

2. Description of the Related Art

Optical devices and image sensing devices including video cameras are designed to be able to easily take good photographs by mounting an anti-vibration function on the optical devices. Such an anti-vibration function detects shaking of the optical device as angular velocity using, for example, an angular velocity sensor, determines a shake amount from the detected angular velocity, shifts an optical path of incident light by driving a correction optical system based on the determined shake amount, and thereby stabilizes an image.

However, there are limits to the range in which the correction optical system can be driven within an optical system. When the limits of the drivable range (control limit positions) are exceeded, it becomes impossible to correct the shaking of the device appropriately.

To solve this problem, Japanese Patent Laid-Open No. 4-328533 proposes to return the correction optical system to the center of the drivable range (center of a movable range) when the correction optical system reaches a limit of the movable range.

Also, Japanese Patent Laid-Open No. 09-080556 proposes a method for correcting a driving amount of the correction optical system so as to return the correction optical system to the center of its movable range when the correction optical system approaches a limit of the movable range, where the driving amount is calculated using a centering gain.

However, with the method proposed in Japanese Patent Laid-Open No. 4-328533, when panning or tilting (hereinafter referred to as "panning" regardless of the direction of panning or tilting) is done for an extended period of time, the correction optical system remains at a limit of the movable range. Consequently, when the correction optical system reaches the limit of the movable range, the shaking of the device cannot be corrected appropriately during panning.

Also, with the method proposed in Japanese Patent Laid-Open No. 09-080556, if a panning operation is continued even after the correction optical system is driven toward the center of the movable range based on the centering gain, the correction optical system reaches the limit of the movable range again as described above. Consequently, the correction optical system repeats the cycle of being driven in a direction of a control limit position due to changes in angular displacement data due to panning and being driven to the center of the movable range due to a centering process, causing blur or unnatural angle-of-view changes in the sensed image.

SUMMARY OF THE INVENTION

The present invention has been made in view of the above problem and provides a device or method which can shoot good images by reducing camera shake and eliminating unnatural movements in the images even during panning and tilting operations.

To achieve the above object, according to one embodiment of the present invention, there is provided an optical device comprising: a shake detection unit configured to detect shake of the optical device; a correction unit configured to correct image blur in a sensed image; a position detection unit configured to detect position of the correction unit; a correction control unit configured to control driving of a shake correction unit based on an output of the shake detection unit and on a position of the correction unit; a panning detection unit configured to detect whether the optical device is panning and detect a direction of the panning if the optical device is panning; an eccentricity direction detection unit configured to detect an eccentricity direction from a center of a movable range of the shake correction unit based on an output of the position detection unit; and a changing unit configured to change correction characteristics of the correction control unit, wherein the changing unit changes the correction characteristics of the correction control unit based on the eccentricity direction detected by the eccentricity direction detection unit and the panning direction detected by the panning detection unit.

Further features of the present invention will become apparent from the following description of exemplary embodiments (with reference to the attached drawings).

BRIEF DESCRIPTION OF THE DRAWINGS

FIGS. 3A to 3C are diagrams showing changes in low-frequency cut-off characteristics, angular velocity data, and angular displacement data when a panning direction coincides with an eccentricity direction of a correction optical system, according to the embodiment;

FIG. 5 is a flowchart showing a switching process of the lower cut-off frequency characteristics according to the embodiment.

DESCRIPTION OF THE EMBODIMENTS

An embodiment of the present invention will now be described in detail below with reference to the accompanying drawings.

Figure 1:
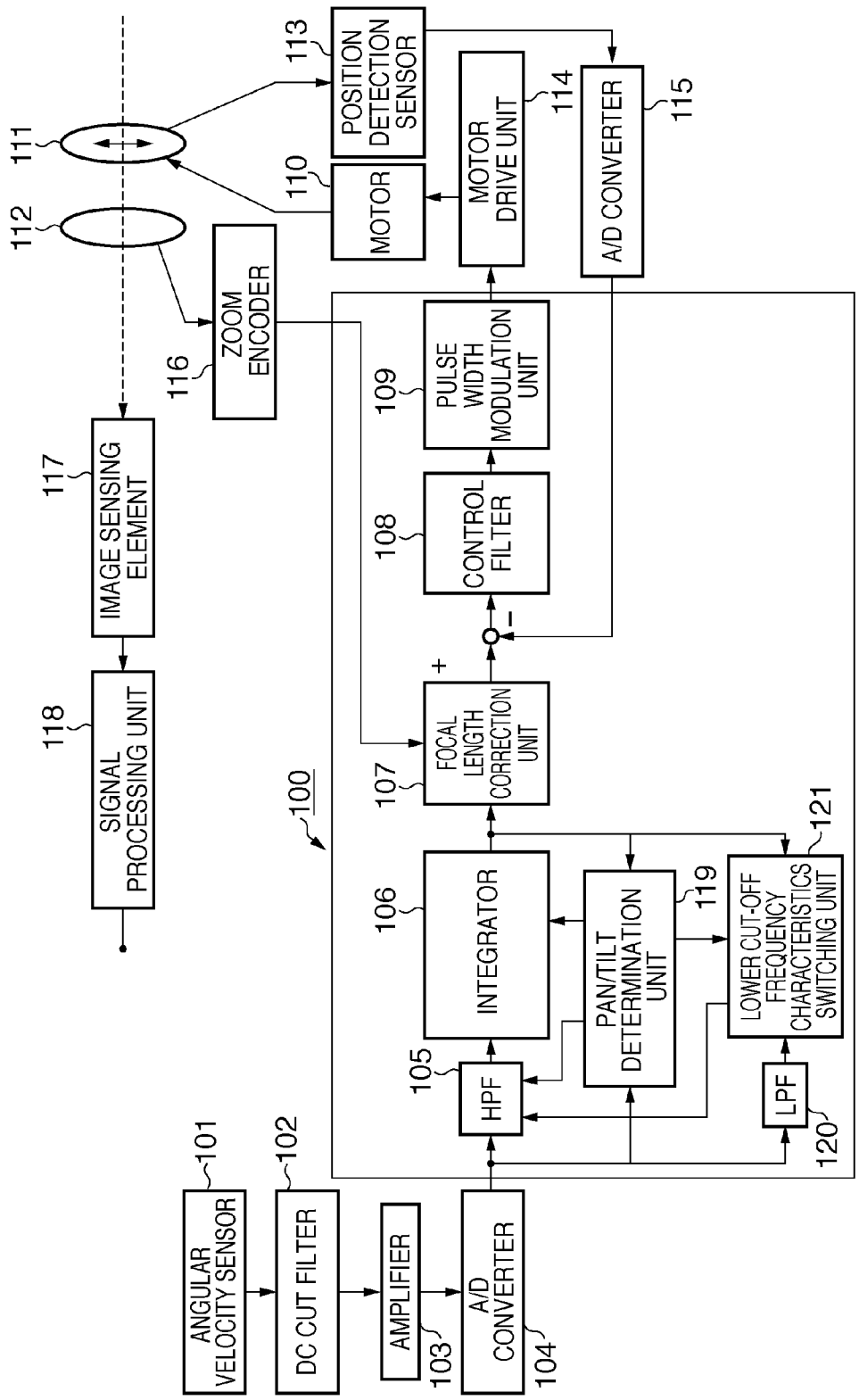
FIG. 1 is a block diagram showing a configuration of an optical device according to an embodiment of the present invention.

FIG. 1 is a diagram showing a schematic configuration of an optical device provided with an anti-vibration function according to the present embodiment, where examples of the optical device includes an image sensing device such as a video camera. In FIG. 1, an angular velocity sensor 101 is installed on a main body of the image sensing device and adapted to detect shaking (vibration) of the device as angular velocity. A DC cut filter 102 cuts off a direct current (DC) component of an angular velocity signal outputted from the angular velocity sensor 101 and thereby passes only an AC component, i.e., a vibration component. An amplifier 103 amplifies and outputs the angular velocity signal outputted by passing through the DC cut filter 102. An A/D (analog/digital) converter 104 converts the angular velocity signal outputted by the amplifier 103 into a digital signal and outputs the digital signal to a shake correction unit 100.

The shake correction unit 100 includes a high pass filter (HPF) 105, an integrator 106, a pan/tilt determination unit 119, a low pass filter (LPF) 120, and a lower cut-off frequency characteristics switching unit 121. Furthermore, the shake correction unit 100 includes a focal length correction unit 107, a control filter 108, a pulse width modulation unit 109, and a difference calculator. The components of the shake correction unit 100 are implemented, for example, by a microcomputer (µCOM).

The HPF 105 is provided with a capability to vary its characteristics in any frequency band and adapted to produce an output by cutting off a low-frequency component from a digital angular velocity signal (angular velocity data) outputted by the A/D converter 104.

The integrator 106 is capable of varying a time constant according to the operating status and the like of the image sensing device and adapted to integrate angular velocity data outputted by the HPF 105 and output resulting data as angular displacement data. The focal length correction unit 107 is adapted to acquire current zoom position information from a zoom encoder 116 of an image sensing optical system 112 and calculate a focal length based on the acquired information, where the image sensing optical system 112 is adapted to perform zooming and focusing operations and the zoom encoder 116 is adapted to detect zoom position. A driving amount (correction data) of a correction optical system 111 is calculated based on the focal length information and the angular displacement data.

The correction optical system 111 includes a correction lens adapted to correct image blur on an image sensing surface by moving in a direction orthogonal to an optical axis of the image sensing optical system 112. Incidentally, although the correction optical system 111 includes a correction lens according to the present embodiment, the correction optical system 111 may be configured, for example, to move an image sensing element 117 in a direction orthogonal to the optical axis of the image sensing optical system 112 as long as similar effects are available. After passing the correction optical system 111 and image sensing optical system 112, light incident upon the image sensing surface is subjected to photoelectric conversion by the image sensing element 117, and then converted into a video signal and subjected to various signal processing by a signal processing unit 118.

The control filter 108 receives a difference between correction data calculated by the focal length correction unit 107 and a digital value (position detection data) of output of a position detection sensor 113 adapted to detect position of the correction optical system 111, where the output of the position detection sensor 113 has been converted into the digital value by an A/D converter 115. The control filter 108 calculates the driving amount of the correction optical system based on a difference between a control target position obtained from correction data of control and current position obtained from current position data of the correction optical system. Then, based on results of the calculation, the pulse width modulation unit 109 generates a drive signal of the optical system.

The pulse width modulation unit 109 converts output of the control filter 108 into a PWM (Pulse Width Modulation) signal and outputs the PWM signal. Based on the PWM output from the pulse width modulation unit 109, a motor drive unit 114 drives a motor 110 adapted to drive the correction optical system 111 in a direction perpendicular to the optical axis, thereby changes an optical axis of incident light on the image sensing surface, and thereby optically corrects blurring of a sensed image.

Based on the angular velocity data outputted by the A/D converter 104 and angular displacement data outputted by the integrator 106, the pan/tilt determination unit 119 determines whether or not the image sensing device is subjected to a panning or tilting (hereinafter referred to as "panning" regardless of the direction of panning or tilting) operation. If it is determined that the image sensing device is being panned by the user, the pan/tilt determination unit 119 performs panning control. In this case, when the angular velocity is equal to or larger than a predetermined threshold, or if the angular displacement is equal to or larger than a predetermined threshold even when the angular velocity is smaller than the predetermined threshold, the pan/tilt determination unit 119 performs panning control by determining that panning is taking place.

The LPF 120 is provided with a capability to vary its characteristics in any frequency band and adapted to produce an output by cutting off a high-frequency component from a digital angular velocity signal (angular velocity data) outputted by the A/D converter 104.

If the pan/tilt determination unit 119 determines that panning is taking place, the lower cut-off frequency characteristics switching unit 121 identifies a panning direction based on the angular velocity data outputted from the LPF 120. Also, the pan/tilt determination unit 119 calculates panning velocity based on variability of the angular displacement data outputted from the integrator 106. Then, based on the panning direction and panning velocity thus determined as well as on the angular displacement data described above, the pan/tilt determination unit 119 performs lower cut-off frequency control by varying a reference value, which is obtained by the pan/tilt determination unit 119 by varying a lower cut-off frequency of the HPF 105 through the panning control.

Figure 2A:
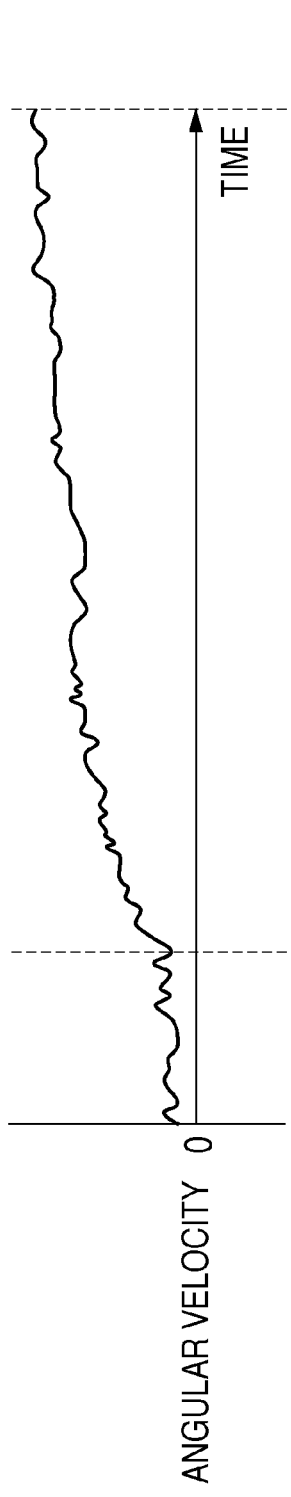
FIGS. 2A and 2B are diagrams showing changes in angular velocity data and angular displacement data with time during panning according to the embodiment.
Figure 2B:
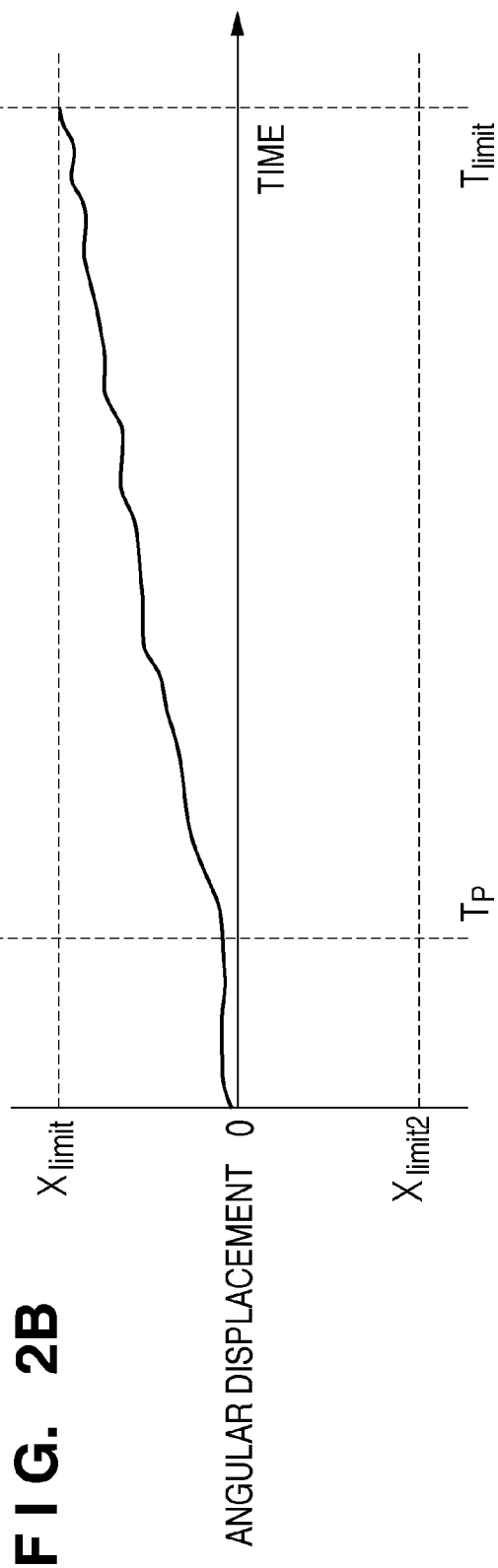

FIGS. 2A and 2B are diagrams showing angular velocity data and angular displacement data during panning. When panning is started at Tp, the angular velocity increases gradually and the angular displacement increases accordingly. At time Tlimit, the angular displacement reaches a control limit position Xlimit of the correction optical system 111. When the control limit position Xlimit is reached, the correction optical system reaches a limit of the movable range, and cannot drive the correction optical system 111 outward any more. Once the correction optical system reaches the limit of the movable range, the driving amount of the correction optical system 111 needed to correct shaking can no longer be secured, making it impossible to correct the shaking of the device appropriately. Therefore, panning control is performed during panning operation to keep the correction optical system 111 from reaching the limit of the movable range.

In panning control, first the lower cut-off frequency of the HPF 105 is changed to a high frequency side. Consequently, a low-frequency component including shaking caused by the panning is removed gradually, and a high-frequency component including camera shake is inputted in the integrator 106 to find displacement due to the camera shake. This allows shake correction to be applied only to the camera shake. Also, the value of the time constant used for integration by the integrator 106 is decreased. Consequently, shake correction position moves gradually to the center of the drivable range (center of the movable range), causing the value of the angular displacement data outputted by the integrator 106 to gradually approach a reference value (value available under no-shake condition). Incidentally, although in the present embodiment, both lower cut-off frequency of the HPF 105 and time constant of the integrator 106 are variable, the present invention may be configured to vary only one of them.

On the other hand, if it is determined that panning is not taking place, the lower cut-off frequency of the HPF 105 is changed to a low frequency side and the value of the time constant used for integration by the integrator 106 is increased. Consequently, the lower cut-off frequency of the HPF 105 and the value of the time constant used for integration by the integrator 106 are returned to their original states, and the panning control is lifted.

Being capable of performing high-frequency shake correction while restraining low-frequency shake correction, the control performed by the pan/tilt determination unit 119 is useful for shake correction during panning.

However, if panning velocity is faster than the frequency characteristics switching of the HPF 105, the correction optical system 111 will reach the limit of the drivable range (control limit position). In that case, although it is possible to correct camera shake which can be corrected by driving the correction optical system 111 toward the center of the movable range, it is not possible to make corrections beyond the control limit position, where the correction optical system 111 cannot be driven. Consequently, at the control limit position, the sensed image will be blurred in a direction opposite to the panning direction.

Thus, with the lower cut-off frequency control according to the present embodiment, the lower cut-off frequency is corrected in any angular displacement data according to the panning direction and panning velocity. First, the detected panning direction is compared with an eccentricity direction (direction of deviation from the center of the movable range) of the correction optical system 111. The eccentricity direction of the correction optical system 111 is detected by the position detection sensor 113. The eccentricity direction is found, for example, by comparing the current position of the correction optical system 111 detected by the position detection sensor 113 with the center position of the drivable range. Incidentally, by moving the correction optical system 111 to the optical axis in advance, the lower cut-off frequency characteristics switching unit 121 may calculate the direction of deviation (eccentricity) from the center position based on the angular displacement data obtained from the integrator 106. Then, based on results of the comparison, the control described below can be performed.

Figures 4A, 4B, 4C:
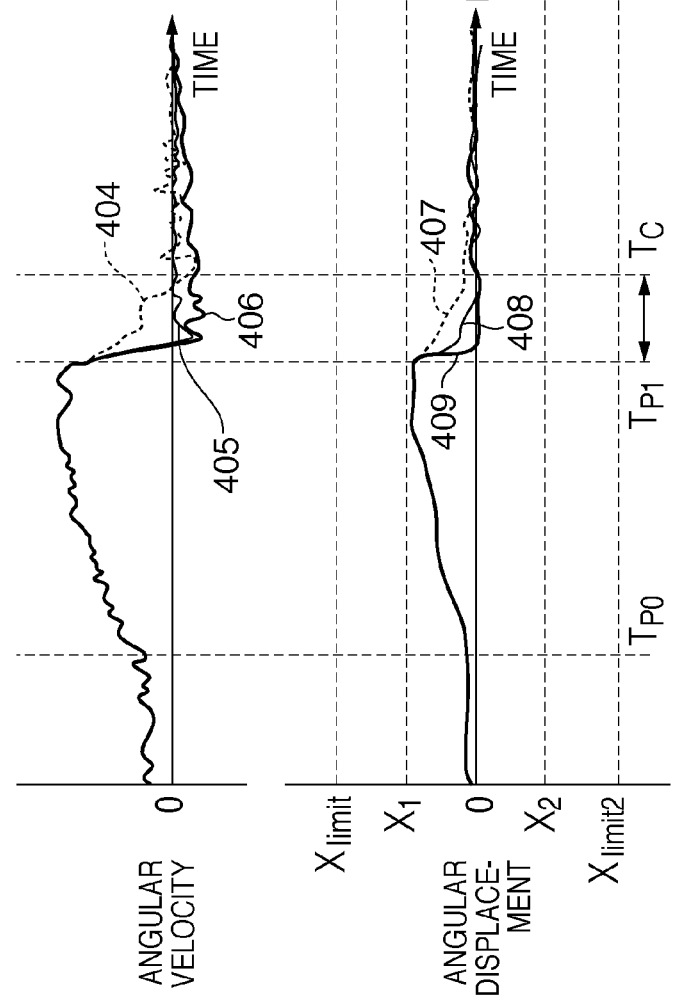
FIGS. 4A to 4C are diagrams showing changes in the lower cut-off frequency characteristics, angular velocity data, and angular displacement data when the panning direction is opposite to the eccentricity direction of the correction optical system, according to the embodiment.

FIGS. 3A to 3C and FIGS. 4A to 4C are diagrams showing changes in the angular velocity data filtered by the HPF 105 and lower cut-off frequency characteristics during panning operation according to the present embodiment. FIGS. 3A to 3C show changes when the image sensing device is panning in the same direction as the eccentricity direction of the correction optical system 111 while FIGS. 4A to 4C show changes when the image sensing device is panning in a direction opposite to the eccentricity direction of the correction optical system 111.

When the image sensing device is panning in the same direction as the eccentricity direction of the correction optical system 111, the lower cut-off frequency of the HPF 105 is changed to characteristics 302 on the higher frequency side than reference characteristics 303 (reference correction characteristics) as shown in FIG. 3C. Consequently, signals only in a narrower frequency band are passed. This prevents increases in the driving amount (correction data) due to a low frequency component during panning and thereby prevents increases in a correction amount. Furthermore, the lower cut-off frequency is changed according to the panning velocity, and if the panning velocity is higher than a predetermined value, the lower cut-off frequency is changed to characteristics 301 on the higher frequency side.

As shown in FIGS. 3A and 3B, the angular velocity data and angular displacement data filtered by the HPF 105 change as shown in graphs 306 and 309, respectively, in terms of the reference correction characteristics 303. Also, the angular velocity data and angular displacement data filtered by the HPF 105 change as shown in graphs 305 and 308, respectively, in terms of characteristics 302 which take the panning direction into consideration and change as shown in graphs 304 and 307, respectively, in terms of characteristics 301.

In this way, when a high-frequency shake component is removed, shake correction performance with respect to camera shake is deteriorated, but increases in a centripetal force are curbed when the correction optical system 111 approaches the control limit position, reducing changes in the sensed image due to shake correction and resulting in an image with natural movements. Since the lower cut-off frequency of the HPF 105 is changed to the higher frequency side with increases in the panning velocity, the lower cut-off frequency is changed to the low frequency side when the panning velocity is low, and thus the shake due to panning is cut, allowing only the camera shake to be corrected appropriately.

On the other hand, if the image sensing device is panning in a direction opposite to the eccentricity direction of the correction optical system 111, the lower cut-off frequency of the HPF 105 is changed to characteristics 402 on the lower frequency side than the reference characteristics 303 (reference correction characteristics) as shown in FIG. 4C. Consequently, signals in a broader frequency band are passed. Since signals in a broader frequency band are passed on the lower cut-off frequency side, a low frequency component is increased during panning, increasing the driving amount (correction data) as a result. Furthermore, the lower cut-off frequency is changed according to the panning velocity, and if the panning velocity is higher than a predetermined value, the lower cut-off frequency is changed to characteristics 401 on the lower frequency side.

As shown in FIGS. 4A and 4B, the angular velocity data and angular displacement data filtered by the HPF 105 change as shown in graphs 404 and 407, respectively, in terms of the reference characteristics 303. Also, the angular velocity data and angular displacement data filtered by the HPF 105 change as shown in graphs 405 and 408, respectively, in terms of characteristics 402 which take the panning direction into consideration and change as shown in graphs 406 and 409, respectively, in terms of characteristics 401.

When the characteristics of the HPF 105 are switched to the low frequency side, the driving amount (correction data) is calculated by taking into consideration a low-frequency shake component of the panning operation, and the centripetal force is increased. This makes it possible to return the correction optical system 111 quickly to the center of the movable range. When the correction optical system 111 is located at the center of the movable range, a wide correction range is secured for shake correction, allowing camera shake occurring after the panning to be corrected appropriately.

Furthermore, the time (Tc−Tpl) required for the correction optical system 111 to return to the center of the movable range after the panning direction is reversed is short and responsiveness to changes in panning is good, which reduces delay of change in the sensed image after the device stops.

Next, a switching process of the lower cut-off frequency characteristics will be described with reference to a flowchart in FIG. 5. First the angular velocity data filtered by the LPF 120 and angular displacement data outputted from the integrator 106 are acquired periodically (S501). Next, using reference lower cut-off frequency characteristics (reference correction characteristics such as the characteristics 303 in FIGS. 3C and 4C), lower cut-off frequency characteristics corresponding to the angular displacement data acquired in 5501 are determined (S502). Then, based on the angular velocity data acquired in 5501, the panning direction is determined.

Furthermore, an average velocity of panning is acquired from an amount of change in the angular displacement data, and the panning velocity is calculated. Thus, panning information which contains the calculated panning direction and panning velocity is generated (S503). Next, the eccentricity direction of the correction optical system 111 is calculated based on the angular displacement data which represents a direction of deviation from the center (S504).

Next, based on the panning information and angular displacement data thus acquired, the pan/tilt determination unit 119 determines whether or not panning is taking place, and if it is, whether or not the panning direction coincides with the eccentricity direction of the correction optical system 111 (S505). If it is determined that panning is not taking place, the flow goes to 5510, without making any change to the reference lower cut-off frequency characteristics. On the other hand, if it is determined that the panning direction coincides with the eccentricity direction, the flow goes to 5506. If it is determined that the panning direction is opposite to the eccentricity direction, the flow goes to 5508.

In 5506, lower cut-off frequency characteristics (correction characteristics which reduce the shake amount: characteristics 302 in FIG. 3C) are determined by shifting the reference lower cut-off frequency characteristics (reference correction characteristics: characteristics 303 in FIG. 3C) to the high frequency side based on the angular displacement data. Subsequently, in 5507, the lower cut-off frequency characteristics determined in 5506 are further changed according to the panning velocity. In this process, the lower cut-off frequency characteristics are shifted further to the high frequency side as the panning velocity increases and further to the low frequency side as the panning velocity decreases. In so doing, the lower cut-off frequency characteristics are shifted to the low frequency side so as to be nearer to the higher frequency side than the reference lower cut-off frequency characteristics. When the process of changing the lower cut-off frequency characteristics is finished, the flow goes to 5510.

On the other hand, in 5508, lower cut-off frequency characteristics (correction characteristics which increase the shake amount: characteristics 402 in FIG. 4C) are calculated by shifting the reference lower cut-off frequency characteristics (reference correction characteristics: characteristics 303 in FIG. 4C) to the low frequency side based on the angular displacement data. Subsequently, in 5509, the lower cut-off frequency characteristics obtained in 5508 by shifting are further changed according to the panning velocity.

In this process, the lower cut-off frequency characteristics are shifted further to the low frequency side as the panning velocity increases and further to the high frequency side as the panning velocity decreases. In so doing, the lower cut-off frequency characteristics are shifted to the high frequency side so as to be nearer to the lower frequency side than the reference lower cut-off frequency characteristics. When the process of changing the lower cut-off frequency characteristics is finished, the flow goes to 5510.

In step 5510, the calculated lower cut-off frequency characteristics are set on the HPF 105, and the series of switching processes is finished.

As described above, according to the present embodiment, the driving amount is corrected by changing the lower cut-off frequency characteristics of the HPF 105 needed to obtain the angular displacement data according to the eccentricity direction, panning direction, and panning velocity, where the angular displacement data is a parameter for determining the driving amount of the correction optical system 111. This makes it possible to shoot good images by reducing camera shake and eliminating unnatural movements in images even during panning operation.

Incidentally, instead of the lower cut-off frequency characteristics of the HPF 105, the time constant of the integrator 106 needed to obtain the angular displacement data can be changed according to the eccentricity direction, panning direction, and panning velocity. In that case, if the panning direction is opposite to the eccentricity direction, a larger time constant is set than that set when panning is not taking place. If the panning direction coincides with the eccentricity direction, a smaller time constant is set than that set when panning is not taking place. Consequently, the resulting angular displacement data changes, making it possible to change the driving amount of the correction optical system 111.

Also, to keep the correction optical system from remaining at the limit of the movable range, the following changes can be made. Specifically, when an offset cancelling unit (not shown) performs offset control to remove an offset component from the angular displacement data, an offset amount to be removed may be changed according to the eccentricity direction, panning direction, and panning velocity. In that case, if the panning direction is opposite to the eccentricity direction, the offset amount is kept at zero. If the panning direction coincides with the eccentricity direction, the offset amount is subtracted from the angular displacement data. Consequently, the angular displacement data changes, making it possible to change the driving amount of the correction optical system 111, as with the control described above.

Also, although in the embodiment described above, the angular velocity data and angular displacement data are used for detection of the panning direction and panning velocity of the image sensing device, the angular velocity data being outputted from the angular velocity sensor and the angular displacement data being a time integral of the angular velocity data, any other method may be used to detect the panning direction and panning velocity. For example, the panning direction and panning velocity acquired from data detected by an acceleration sensor installed in the main body of the image sensing device separately from the angular velocity sensor 101 may be used. Also, the panning direction and panning velocity may be acquired from a movement vector detected in a luminance signal of a video signal generated by the signal processing unit 118 from sensed images.

A preferred embodiment of the present invention has been described in detail above. Nevertheless, the present invention is not limited to specific embodiments and the invention can be achieved through various other embodiments without departing from the spirit and scope of the invention. Parts of the embodiment described above may be combined as appropriate. Also, although an image sensing device (video camera) has been described in the embodiment, the present invention is also applicable to interchangeable lenses of a single-lens reflex camera or other similar optical devices.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-141884, filed Jun. 22, 2010, which is hereby incorporated by reference herein in its entirety.

What is claimed is:

1. An optical device comprising:
    a shake detection unit configured to detect shake of the optical device;
    a correction unit configured to correct image blur in a sensed image;
    a position detection unit configured to detect position of said correction unit;
    a correction control unit configured to control driving of a shake correction unit based on an output of said shake detection unit and on a position of said correction unit;
    a panning detection unit configured to detect whether the optical device is panning and detect a direction of the panning if the optical device is panning;
    an eccentricity direction detection unit configured to detect an eccentricity direction from a center of a movable range of the shake correction unit based on an output of said position detection unit; and
    a changing unit configured to change correction characteristics of said correction control unit,
    wherein said changing unit changes the correction characteristics of said correction control unit based on the eccentricity direction detected by said eccentricity direction detection unit and the panning direction detected by said panning detection unit.

2. The optical device according to claim 1, wherein:
    said correction control unit includes a filter unit configured to cut off shake of a lower frequency than a cut-off frequency from the shake detected by said shake detection unit, the filter unit being preset with a predetermined reference cut-off frequency when panning is not taking place; and
    when the eccentricity direction is opposite to the panning direction, said changing unit decreases the cut-off frequency below the reference cut-off frequency.

3. The optical device according to claim 2, wherein:
    said panning detection unit further detects panning velocity of said optical device; and
    when the eccentricity direction is opposite to the panning direction, said changing unit decreases the cut-off frequency with increases in the panning velocity.

4. The optical device according to claim 1, wherein:
    said correction control unit includes a filter unit configured to cut off shake of a lower frequency than a cut-off frequency from the shake detected by said shake detection unit, the filter unit being preset with a predetermined reference cut-off frequency when panning is not taking place; and
    when the eccentricity direction coincides with the panning direction, said changing unit increases the cut-off frequency above the reference cut-off frequency.

5. The optical device according to claim 4, wherein:
    said panning detection unit further detects panning velocity of the optical device; and
    when the eccentricity direction coincides with the panning direction, said changing unit increases the cut-off frequency with increases in the panning velocity.

6. The optical device according to claim 1, wherein:
    said correction control unit includes an integrator configured to use a variable time constant in integrating the shake detected by said shake detection unit, the integrator being preset with a predetermined reference time constant when panning is not taking place; and
    when the eccentricity direction coincides with the panning direction, said changing unit sets a time constant smaller than the reference time constant.

7. The optical device according to claim 1, wherein:
    said correction control unit includes an offset cancelling unit configured to remove a predetermined offset amount from the shake detected by said shake detection unit; and
    when the eccentricity direction coincides with the panning direction or a tilting direction, said changing unit subtracts the offset amount from a correction amount based on the output of the shake detection unit.

8. The optical device according to claim 1, wherein:
    said correction control unit includes an integrator configured to use a variable time constant in integrating the shake detected by said shake detection unit, the integrator being preset with a predetermined reference time constant when panning is not taking place; and
    when the eccentricity direction is opposite the panning direction, said changing unit sets, for the integrator, a time constant larger than the reference time constant.

* * * * *